United States Patent
Di Cairano et al.

(10) Patent No.: US 9,618,912 B2
(45) Date of Patent: Apr. 11, 2017

(54) MPC CONTROLLER USING PARALLEL QUADRATIC PROGRAMMING

(71) Applicant: Mitsubishi Electric Research Laboratories, Inc., Cambridge, MA (US)

(72) Inventors: Stefano Di Cairano, Somerville, MA (US); Matthew Brand, Newton, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 809 days.

(21) Appl. No.: 14/023,916

(22) Filed: Sep. 11, 2013

(65) Prior Publication Data

US 2014/0343695 A1    Nov. 20, 2014

Related U.S. Application Data

(60) Provisional application No. 61/824,451, filed on May 17, 2013.

(51) Int. Cl.
  *G05B 13/00*   (2006.01)
  *G05B 13/04*   (2006.01)

(52) U.S. Cl.
  CPC .................. *G05B 13/048* (2013.01)

(58) Field of Classification Search
  CPC .................................... G05B 13/048
  USPC ......................................... 700/39
  See application file for complete search history.

(56) References Cited

U.S. PATENT DOCUMENTS

| | | | | |
|---|---|---|---|---|
| 8,078,291 B2* | 12/2011 | Pekar | ................. | G05B 13/048 |
| | | | | 700/28 |
| 8,600,525 B1* | 12/2013 | Mustafa | ............... | G05B 13/048 |
| | | | | 700/1 |

OTHER PUBLICATIONS

Brand et al.; A Parallel Quadratic Programming Algorithm for Model Predictive Control; Aug. 2011; Mitsubishi Electric Research Laboratories; TR2001-056.*

Tenny, M.J., Wright, S.J. & Rawlings, J.B. "Nonlinear Model Predictive Control via Feasibility-Perturbed Sequential Quadratic Programming," Computational Optimization and Applications, Apr. 2004, vol. 28, No. 1, pp. 87-121.*

Di Cairano et al. "Model Predictive Control Tuning by controller Matching." IWWW Transactions on Automatic Control, vol. 55, No. 1, Jan. 2010.

* cited by examiner

*Primary Examiner* — Christopher E Everett (74) *Attorney, Agent, or Firm* — Gene Vinokur; James McAleenan; Hironori Tsukamoto (57) ABSTRACT

A method controls an operation of a machine using a model predictive control (MPC). The method determine, in response to receiving a state of the operation of the machine, a dual solution of a dual parametric problem of a parametric form of the MPC using a parallel quadratic programming (PQP) rescaling iteratively a candidate dual solution of the dual parametric problem. The coefficients of the dual parametric problem include data representing dynamics of the machine and constraints on the operation of the machine. A parameter of the dual parametric problem includes the state of the operation of the machine. The method determines a primal solution of a primal problem of the MPC using the dual solution of the dual parametric problem.

16 Claims, 9 Drawing Sheets

MPC CONTROLLER USING PARALLEL QUADRATIC PROGRAMMING

RELATED APPLICATION

This application claims priority to U.S. Provisional Application No. 61/824,451, "MPC Controllers Using Parallel Quadratic Programming," filed on May 17, 2013 by Di Cairano et al.

FIELD OF THE INVENTION

This invention relates to predictive controllers for machines, and more particularly to predictive controllers generating motion for the machines subject to constraints on the machines using parallel quadratic programming.

BACKGROUND OF THE INVENTION

A machine, as used herein, is any apparatus that can be controlled by an input signal (input). The input signal can be associated with physical quantities, such as voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine can be modeled by a set of equations representing changes of the output over time as functions of current and previous inputs and previous outputs. During the operation, the machine can be defined by a state of the machine. The state of the machine is any set of information, in general time varying, that together with the model and future inputs, can define future motion. For example, the state of the machine can include an appropriate subset of current and past inputs and outputs.

The controller for the machine includes a processor for performing a method, and a memory for storing the model. The method is performed during fixed or variable periods. The controller receives the machine output and the machine motion. The controller uses the output and motion to generate the input for the machine.

The machine is subject to constraints, which can be related to the physical environment, machine parts, and machine operational limits. The method is predictive when the controller generates the optimal motion based on the model, a current state of the machine, a desired future behavior of the machine, and the constraints. The controller solves an optimal control problem for a future time starting from the current time.

Some known methods are based on model predictive control (MPC), e.g., U.S. Pat. Nos. 6,807,510, and 7,454,253, where an optimal control problem for a future time is based on the model, the current state, the desired motion, and the constraints. Due to the presence of constraints, unconstrained MPC cannot be applied in that context, see U.S. Pat. No. 7,050,863.

The control problem can be converted to a constrained quadratic programming (QP) problem solved by a constrained optimization procedure. For example, a U.S. 2006/0282177 describes an interior point method for solving the QP problem, and U.S. Pat. No. 7,152,023 describes an active set method. Those methods are computationally complex, e.g., the methods use complex matrix factorization ill-suited for the embedded processors.

SUMMARY OF THE INVENTION

The embodiments of the invention provide a predictive controller for a machine that uses linear models subject to constraints. In various embodiments, the controller is model predictive control (MPC) controller that uses parallel quadratic (PQP) programming method to solve a quadratic programming (QP) problem.

The PQP is not suitable for the MPC in the general form. However, the usage of PQP can increase the computational efficiency of the controller. Some embodiments are based on an observation that, for the convex quadratic programs, the solution to a dual problem represents the solution to the primal problem. In contrast with the primal problem, the dual problem can be solved using the PQP and the solution to the primal problem can be readily derived from the solution of the dual problem.

The PQP uses rescaling of the candidate solution, which in turn requires a lot of iterations for each cycle of predictive control. For each iteration of the rescaling, the scaling coefficients are updated due to updates of the state of the controlled machine. This is because the scaling coefficients include the state. Thus, if the state is updated, the scaling coefficients have to be updates as well. Such update slows down the computation.

Some embodiments are based on a realization that the convex quadratic program can be rewritten into a different form—parametric quadratic program. The advantage of that form is that the state of the control machine is no longer part of any problem matrices and/or coefficients, but an independent parameter of the optimization. It was further realized that primal problem in the parametric quadratic form also has corresponding dual problem in the parametric quadratic form. Such form is suitable for the PQP and does not require constant update of the scaling coefficient, because the state now is independent optimization parameter. Generally, a solution of a dual problem in parametric is difficult to obtain. However, the above mentioned realizations allow pre-computing all matrices required for the solution, and, in combination with the PQP, increases the computational efficiency of the controller.

Accordingly, some embodiments of the invention represent the linear MPC problem in a dual parametric form with the state of the controlled machine as a parameter, acquire precomputed problem matrices representing, e.g., the structure, and dynamics of the machine to be controlled, as well as constraints and of the machine and objectives of the operation, and solve the dual parametric problem using the PQP.

Additionally, some embodiments reduce a number the PQP iterations by periodically or intermittently applying an acceleration technique in a specific subspace of the optimization problem space. Those embodiments are based on a recognition that a various factors can slow down the convergence of PQP. For example, when the current candidate solution of the PQP is close to zero, or scaling factors of the PQP are close to one, the change of the candidate solution can be very small.

To avoid such problem, some embodiments update the value of the candidate solution by a different type of operation, i.e., not scaling. For example, some embodiment determine gradient of the convex quadratic function to be minimized by dual problem at the candidate solution. However, the change of the candidate value according to the gradient may take the candidate solution outside of feasible region of the dual problem. And, if the solution goes into the unfeasible region, the PQP method fails.

However, some embodiment are based on another realization that in contrast with the feasible region of the primal problem, which depends on the specific operation, the feasible region of the dual problem is always non-negative cone (positive), and is not bounded. Thus, if the antigradient is represented by its components, one component may point into the unfeasible region, and one component may point toward the unbound direction, i.e., the direction where the positive cone is unbounded. Thus, some embodiments select only the components of the anti-gradient that points toward the unbound direction to update the candidate solution. Such modification of the anti-gradient guaranties ensures that the candidate solution always stays in the feasible region.

Some additional modifications of the embodiments are based on another observation that primal problem has physical meaning, but the dual problem has no physical meaning. Thus, the termination condition provided by the user for the solution of the primal problem can have no sense, i.e., no physical meaning, for the dual form. However, there is predetermined relationship between the dual and the primal problem. So, some embodiments convert the termination condition for optimization of the primal problem into the termination condition of the dual problem based on that relationship.

Duality gap is the difference between feasible primal and dual solutions. The duality gap corresponding to the optimal solution for the primal and dual problem is zero. Some embodiments determine termination condition based on the duality gap.

Some embodiments of the invention are based on a realization that PQP algorithm is fast to reach the near optimal solution but slow to converge to the real optimal solution. Therefore, some embodiments transform user termination condition for the primal problem into the conditions on the duality gap and use the duality gap as the termination condition for dual problem. Some embodiments also express constraints slacks as function of the dual parametric form.

Accordingly, one embodiment describes a method for controlling an operation of a machine using a model predictive control (MPC). The method includes determining, in response to receiving a state of the operation of the machine, a dual solution of a dual parametric problem of a parametric form of the MPC using a parallel quadratic programming (PQP) rescaling iteratively a candidate dual solution of the dual parametric problem, wherein coefficients of the dual parametric problem include data representing dynamics of the machine and constraints on the operation of the machine, and wherein a parameter of the dual parametric problem includes the state of the operation of the machine; and determining a primal solution of a primal problem of the MPC using the dual solution of the dual parametric problem. The steps of the method are performed by a processor.

Optionally, one embodiment determines the termination condition based on a relationship between the dual parametric and a corresponding primal parametric problem. For example, the termination condition can be determines based on a duality gap representing a difference between feasible primal and dual solutions.

Additionally, some embodiments perform an acceleration step by selecting as a decreasing direction a vector of positive components of a negative cost function gradient, so that an update by the acceleration step does not require an a-posteriori projection, and as step length is optimal in the decreasing direction.

Another embodiment discloses a method for controlling an operation of a machine using a model predictive control (MPC). The method includes acquiring matrices representing dynamics of the machine and constraints on the operation of the machine; formulating the MPC as a dual parametric problem having the matrices as coefficients and a state of the operation as a parameter of the dual parametric problem; and solving the dual parametric problem using a parallel quadratic programming (PQP) rescaling iteratively a solution of the dual parametric problem.

Yet another embodiment discloses a controller for controlling an operation of a machine. The controller includes a memory for storing matrices representing dynamics of the machine and constraints on the operation of the machine; and a processor for solving, using a parallel quadratic programming (PQP), a dual problem of a parametric form of a model predictive control (MPC), wherein coefficients of the dual problem include the matrices and a parameter of the dual problem includes a state of the operation of the machine.

DETAILED DESCRIPTION OF THE PREFERRED EMBODIMENTS

Parallel Quadratic Programming

Some embodiments of the invention provide a system and a method for parallel implementations of quadratic programming (QP) problems in model predictive control (MPC). The embodiments used a programming update rule that is amenable to parallelization, hence the name parallel quadratic programming (PQP). Such parallelization can be accomplished at high performance levels, for e.g. as fine-grain parallelization and other advanced forms of parallelization known to those skilled in the art.

The PQP is provably convergent and is related to matrix-splitting methods for linear complementarily problems for solving saddle-point problems. The PQP update according to some embodiments is given in closed form and can be determined independently for each variable. Accordingly, the PQP is completely parallelizable for any problem data structure, and can readily exploit the full parallelism of multiprocessor machines, including multi-core, single-instruction/multiple data (SIMD) and graphic processing units (GPU). The PQP implementation can be reduced to matrix-vector products and a scalar divide, and such simplicity provides considerable speed advantages even when implemented on serial computers.

Figure 1:
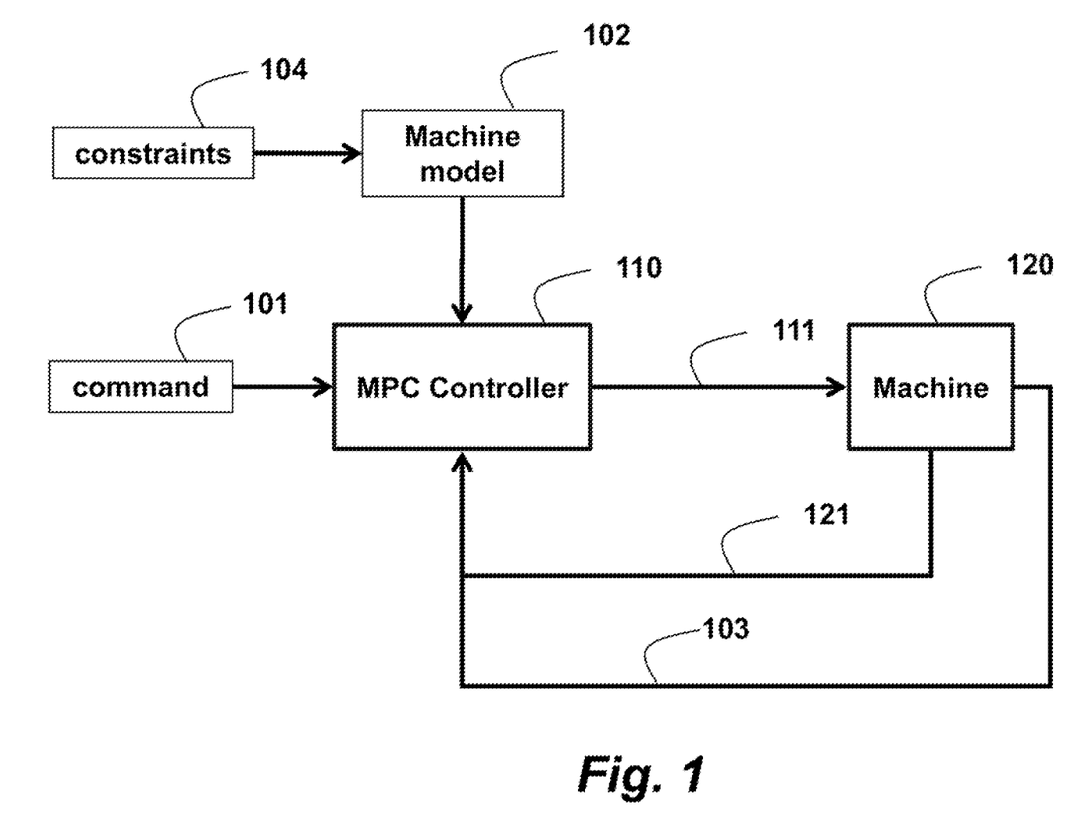
FIG. 1 is a block diagram of a controller and machine according to embodiments of the invention.

FIG. 1 shows an example machine 120 connected to a model predictive control (MPC) controller 110 according to some embodiments of the invention. The controller 110 is programmed according to a model 102 of the machine. The model can be a set of equations representing changes of the output 103 of the machine 120 over time as functions of current and previous inputs 11 and previous outputs 103. The model can include constraints 104 that represent physical and operational limitations of the machine. One embodiment expresses the model 102 as a linear difference equation $$x_m(k+1)=A_m x_m(k)+B_m u(k)$$

$$y(k)=C_m x_m(k)+D_m u(k), \quad (1)$$

where k is a time when the signals are sampled, and $A_m$, $B_m$, $C_m$, and $D_m$ are parameters of the model.

During the operation, the controller receives a command d 101 indicating the desired behavior of the machine. The command can be, for example, a motion command. In response to receiving the command 101, the controller generates input u 111 for the machine. In response to the input, the machine updates the output y 103 and a state $x_m$ 121 of the machine.

Figure 2:
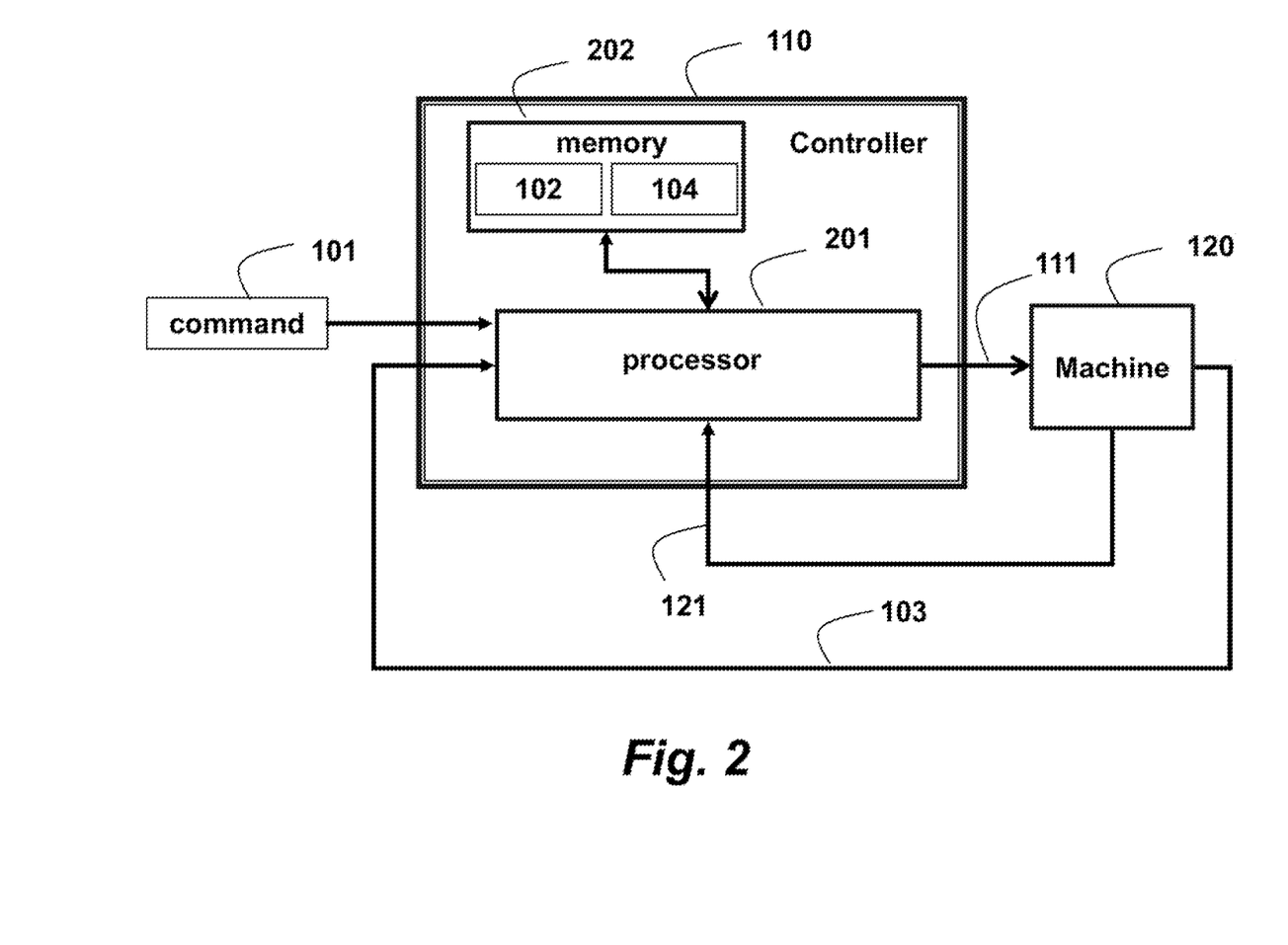
FIG. 2 is a block diagram of the controller according to embodiments of the invention.

FIG. 2 shows a block diagram of the controller 110 according one embodiment of the invention. The controller 110 includes a processor 201 connected to a memory 202 for storing the model 102 and the constraints 104. The controller actuates the machine so that the machine output follows a desired motion, also called reference, which is the output generated by a reference model that represents the desired motion of the machine as specified by an operator or a supervisory software $$v(k+1)=A_r v(k)$$

$$r(k)=C_r v(k), \quad (2)$$

where v is a reference state of the reference model and r is a reference output of the reference model, and $A_r$, $C_r$ are the parameters that define reference model.

One embodiment determines a comprehensive model of the system by joining the models of Equation 1 and Equation 2 as $$x(k+1)=Ax(k)+Bu(k)$$

$$y(k)=Cx(k)+Du(k), \quad (3)$$

where the full state x includes the machine state $x_m$ the reference model state v, and optionally the reference output r and the machine output y. Other variations of determining the model are possible.

The operation of the machine is subject to constraints 104 that describe physical and operational limits expressed, e.g., by a set of linear inequalities $$M_x x(k)+M_u u(k) \leq M_0, \quad (4)$$

where $M_x$, $M_u$ are matrices with a number of columns equal to the size of the full state x, and the full input u, and a number of rows equal to the total number of constraints for the machine, and $M_0$ is a vector with number of rows equal to the total number of constraints for the machine.

Figure 3:
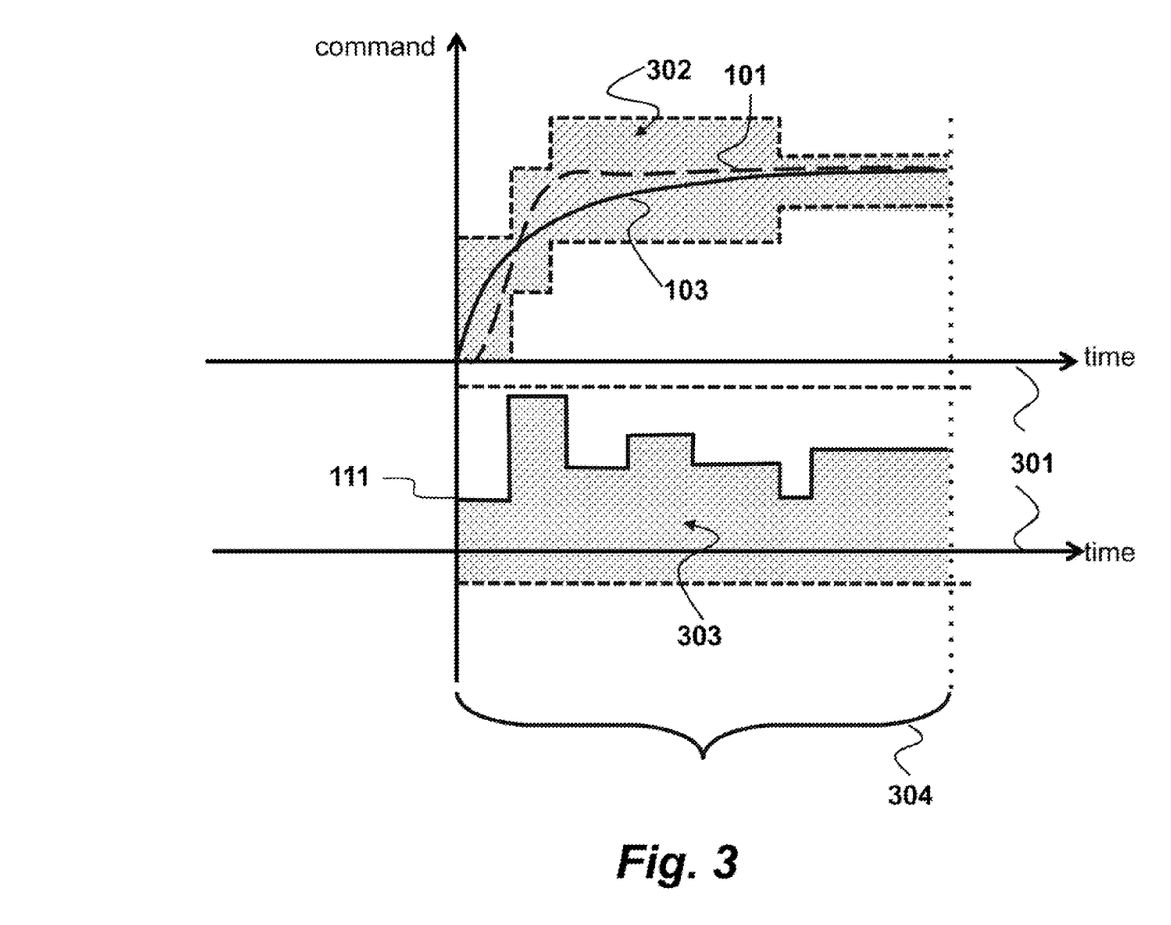
FIG. 3 is a timing diagram of machine motions according to embodiments of the invention.

FIG. 3 shows a timing diagram of motions of the machine 120 according to some embodiments of the invention. The MPC controller 110 generates the input for the machine to perform the desired motion while enforcing the constraints using the expected machine behavior according to the model. The constraints can include regions of feasible motion 302 and feasible input 303.

The MPC, at each time k 301, solves a finite time optimal control problem for a prediction interval 304, e.g., from the current time till the N next times $$\min_{u(k+0),\ldots,u(k+N-1)} x(k+N)'Px(k+N) + \sum_{i=0}^{N-1} x(k+1)'Qx(k+i)+u(k+i)'Ru(k+i)$$

s.t. Eqn (3), Eqn (4)

Given x(k), where P, Q, R are symmetric positive definite or positive semidefinite weighting matrices and ' indicates a vector transposition. The optimal solution is the machine input u(k+0), ..., u(k+N−1) all or in part, i.e., until the next time k.

The output y 103 following the command 101 for the desired motion r can be obtained by formulating in Equation (5) the distance between r and y according to $$x'Qx = \begin{bmatrix} x_m \\ v \\ y \\ r \end{bmatrix}' \cdot \begin{bmatrix} 0 & 0 & 0 & 0 \\ 0 & 0 & 0 & 0 \\ 0 & 0 & 1 & -1 \\ 0 & 0 & -1 & 1 \end{bmatrix} \cdot \begin{bmatrix} x_m \\ v \\ y \\ r \end{bmatrix}$$

$$= (y-r)^2.$$

The MPC optimal control problem in Equation (5) can be formulated as a parallel quadratic program problem $$\min_U 0.5 \cdot U'Q_p U + F_p'U$$

s.t. $H_p U \leq J_p$, (6)

where a cost Hessian matrix $Q_p$, a cost linear term vector $F_p$, a constraint matrix $H_p$, and a constraint constant vector $J_p$ are coefficients of the parallel quadratic program problem computed from the parameters in matrices in Eqs. (3), (4), and (5).

For example, one embodiment determines the coefficients of the parallel quadratic program problem by first computing the forced and free response matrices along the future N-steps, respectively $$R_r = \begin{bmatrix} 0 & 0 & \ldots & 0 \\ B & 0 & \ldots & 0 \\ AB & B & \ldots & 0 \\ \vdots & \vdots & \ddots & \vdots \\ A^{N-1}B & A^{N-1}B & \ldots & B \end{bmatrix},$$

$$F_r = \begin{bmatrix} A^0 \\ A^1 \\ \vdots \\ A^N \end{bmatrix}.$$

Then the embodiment determines the state and input cost matrices, respectively $$Q_r = \begin{bmatrix} Q & 0 & \cdots & 0 \\ 0 & \ddots & \ddots & \vdots \\ \vdots & \ddots & Q & \vdots \\ 0 & \cdots & \cdots & P \end{bmatrix},$$

$$V_r = \begin{bmatrix} R & 0 & \cdots & 0 \\ 0 & \ddots & \ddots & \vdots \\ \vdots & \ddots & R & \vdots \\ 0 & \cdots & \cdots & R \end{bmatrix}.$$

Next, the embodiment determines the constraint matrices $$M_r = \begin{bmatrix} M_x & 0 & \cdots & 0 \\ 0 & \ddots & \ddots & \vdots \\ \vdots & \ddots & M_x & \vdots \\ 0 & \cdots & \cdots & M_x \end{bmatrix},$$

$$M_v = \begin{bmatrix} M_u & 0 & \cdots & 0 \\ 0 & \ddots & \ddots & \vdots \\ \vdots & \ddots & M_u & \vdots \\ 0 & \cdots & \cdots & M_u \end{bmatrix},$$

$$M_c = \begin{bmatrix} M_0 \\ M_0 \\ \vdots \\ M_0 \end{bmatrix}.$$

By expressing the cost function of Equation (5) in terms of the free and forced response matrices, and by expressing the constraints (3), (4) in (5) in terms of the free and forced response matrices, the embodiments determines the coefficients according to $$Q_p = 2(R_r'Q_rR_r + V_r),$$

$$F_p = 2)x(k)F_r'Q_rR_r) - x(k)Qx(k),$$

$$H_p = M_rR_r + M_r,$$

$$J_p = M_c - M_rF_rx(k). \tag{7}$$

Notably, as a consequence of the construction, the matrices in Equation 6 depends on the state x(k).

Various embodiments of the invention use PQP to increase the computational efficiency of the controller 110. However, the PQP is not well suited for the MPC in the general form. Thus, some embodiments use an observation that, for the convex quadratic programs, the solution to a dual problem represents the solution to the primal problem. In contrast with the primal problem, the dual problem can be solved using the PQP and the solution to the primal problem can be readily derived.

The MPC optimal control problem in Equation 6 can be solved by the associated dual parametric problem $$\min_Y 0.5 Y'Q_dY + F_d'Y$$

$$\text{s.t. } Y \geq 0, \tag{8}$$

where the dual cost Hessian matrix $Q_d$, and the dual cost linear term vector $F_d$, are computed from $Q_p$, $F_p$, $H_p$, $J_p$, in Equation (7), according to $$Q_d = G_pQ_p^{-1}G_p', F_d = K_p + G_pQ_p^{-1}F_p.$$

The solution of Equation 6 is generated from the solution of Equation 8 by $$U = \Phi Y + \psi, \tag{9}$$

wherein the dual to primal transformation matrix $\Phi$ and the dual to primal transformation vector $\psi$ are computed from $Q_p$, $F_p$, $H_p$, $J_p$, according to $$\Phi = -Q_p^{-1}G_p', \psi = -Q_p^{-1}F_p.$$

The conversion from Equation 5 to Equation 8 is complex and involves many operations at each time k, i.e., every time a new MPC optimal control problem has to be solved. Specifically, the PQP uses rescaling of the candidate solution, which in turn requires a lot of iterations for each cycle of predictive control. For each iteration of the rescaling, the scaling coefficients are updated due to updates of the state of the controlled machine. This is because the scaling coefficients include the state. Thus, if the state is updated, the scaling coefficients have to be updates as well. Such update slows down the computation.

Some embodiments are based on a realization that the convex quadratic program can be rewritten into a parametric quadratic program. The advantage of that form is that the state of the control machine is no longer part of any problem matrices and/or coefficients, but an independent parameter of the optimization. It was further realized that primal problem in the parametric quadratic form also has corresponding dual problem in the parametric quadratic form. Such form is suitable for the PQP and does not require constant update of the scaling coefficient, because the state now is independent optimization parameter.

For example, the Equation 5 can be formulated in parametric form as $$\min_U 0.5 \cdot U'Q_pU + x(k)'C_p'U$$

$$\text{s.t. } H_pU \leq W_p + S_px(k), \tag{10}$$

where the state-independent constraint constant vector $W_p$, the state-dependent constraint constant matrix $S_p$, and the state dependent cost linear term matrix $C_p$, are also obtained from Eqs. (3), (4), and (5). The matrices $W_p$, $S_p$, $C_p$, are independent from x(k). For every time k, only the value of x(k) is updated to reduce the number of processing steps. However, for the PQP, the dual problem in Equation 8 still has to be constructed from Equation 10 at each time k, which requires a considerable amount of operations.

Therefore, we modify the conventional PQP so that additional operations of conversion from the form of Equation 5 to the form of Equation 8 are not required.

This is based on the realization that a dual parametric form $$\min_Y 0.5 \cdot Y'Q_dY + x(k)'S_d'Y + W_d'Y$$

$$\text{s.t. } Y \geq 0 \tag{11}$$

can be determined directly from Equation 10, where $S_d$ is a state-dependent dual cost linear term matrix and $W_d$ is a state independent dual cost linear term vector.

These results in modified iterations rescaling a candidate solution Y till the termination condition are met according to $$Y^{(h+1)} = \frac{(Q_d^- + \varphi)Y^{(h)} + (S_d x(k) + W_d)^-}{(Q_d^+ + \varphi)Y^{(h)} + (S_d x(k) + W_d)^+} Y^{(h)}, \quad (12)$$

The operators $(x)^-$ and $(x)^+$ indicate $\max(0, -x)$ and $\max(0, x)$ component-wise for x, $\phi$ is the PQP convergence constant vector that guarantees convergence. Hence, $Q_d^+$, $Q_d^-$ are the positive and negative component of the dual cost Hessian matrix. The iteration is performed until a fix point $(Y(h+1)=Y(h))$, which is the optimal solution, $Y^*$.

Also, a similar transformation can be applied to Equation 9 to produce $$U = \Phi Y^* + \Gamma x(k), \quad (13)$$

where $\Box$ is the dual to primal state-dependent transformation matrix. Equation 13 determines the machine input from the fixed point of the iterations in Equation 11. The finding the fixed point of Equation 12 and using the fixed point to compute Equation 13 provides the solution of Equation 10 for the current value of the state x(k). Hence, the optimal input for the machine that satisfies the machine constraints can be determined.

The matrices $S_d$, $W_d$, $Q_d^+$, $Q_d^-$, are all pre-determined an offline phase when the controller is programmed for a specific machine, and the only computations that need to be performed online during controller operation are in Eqs. (12) and (13). Thus, there is no need to perform any additional transformation.

Generally, a solution of a dual problem in parametric is difficult to obtain. However, the above mentioned realizations allow pre-computing all matrices required for the solution, and, in combination with the PQP, increases the computational efficiency of the controller.

The modified iteration form the dual parametric form in Equation 11 by pre-computing the matrices and storing the matrices in the memory, thus avoiding operations for conversion in real-time. This ways the number computations performed by the controller is reduced, and hence, the controller can operate at higher control rate, or at the same control rate in a simpler processors.

Figure 4:
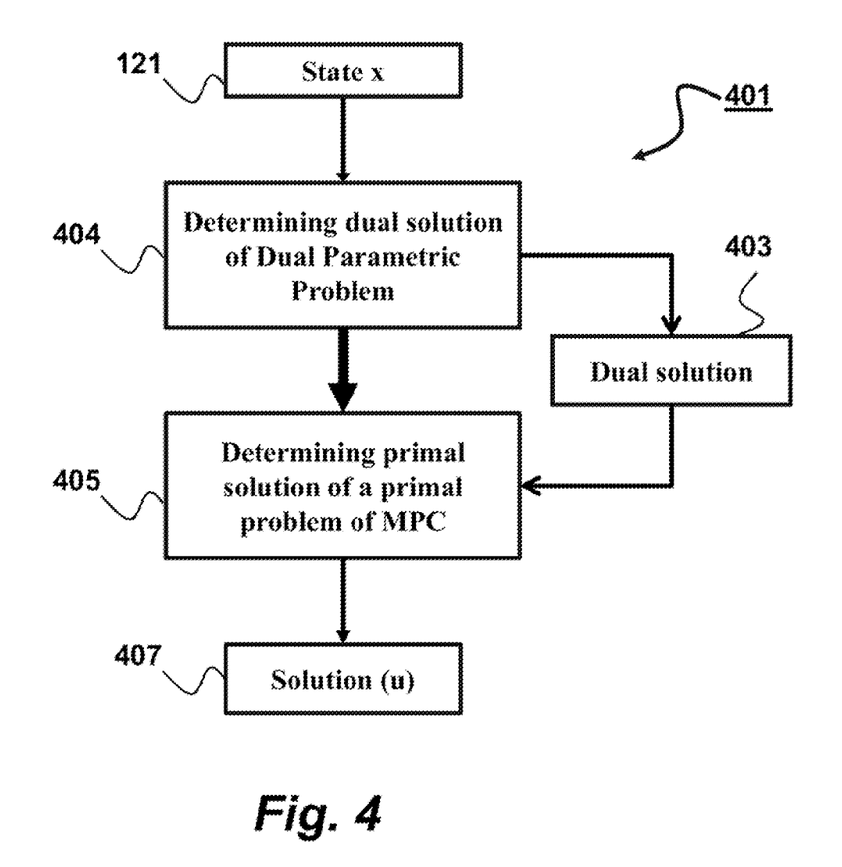
FIG. 4 is a block diagram of a method for solving a MPC optimal control problem according to embodiments of the invention.

FIG. 4 shows the method according to an embodiment of the invention. The steps of the method are performed by a processor 401. The method determines 404, in response to receiving 401 a state of the operation of the machine, a dual solution 403 of a dual parametric problem of a parametric form of the MPC using a parallel quadratic programming (PQP). For example, the PQP can rescale iteratively a candidate dual solution of the dual parametric problem according to Equation 12. The coefficients of the dual parametric problem include data representing dynamics of the machine and constraints on the operation of the machine, and are predetermined. A parameter of the dual parametric problem includes the state of the operation of the machine and is updated in real time.

Next, the method determine 405 a primal solution 407 of the MPC using the dual solution of the dual parametric problem. The primal solution 407 forms the control signal 111. For example, the primal solution can be determined using Equation 13.

Duality Gap

Some additional modifications of the embodiments are based on another observation that primal problem has physical meaning, but the dual problem has no physical meaning. Thus, the termination condition provided by the user for the solution of the primal problem can have no sense, i.e., no physical meaning, for the dual form. However, there is predetermined relationship between the dual and the primal problem. So, some embodiments convert the termination condition for optimization of the primal problem into the termination condition of the dual problem based on that relationship.

Duality gap is the difference between feasible primal and dual solutions. The duality gap corresponding to the optimal solution for the primal and dual problem is zero. Some embodiments determine termination condition based on the duality gap.

Some embodiments of the invention are based on a realization that PQP algorithm is fast to reach the near optimal solution but slow to converge to the real optimal solution. Therefore, some embodiments transform user termination condition for the primal problem into the conditions on the duality gap and use the duality gap as the termination condition for dual problem. Some embodiments also express constraints slacks as function of the dual parametric form. Those embodiments determine the duality gap directly from the dual parametric form.

One embodiment determines the duality gap $\Delta J$ using the dual parametric form according to $$\Delta J(h) = Y^{(h)'} Q_d Y^{(h)} + x(k)' S_d' Y^{(h)} + W_d' Y^{(h)}. \quad (14)$$

Additionally or alternatively the embodiment determines a constraint slack according to $$T(h) = -S_d x(k) - W_d - Q_d Y^{(h)}. \quad (15)$$

The rescaling of the PQP is terminated when $$\Delta J(h) \le \max(\epsilon_1(0.5 \cdot Y^{(h)'} Q_d Y^{(h)} + x(k)' S_d' Y^{(h)} + W_d' Y^{(h)} + 0.5 x(k)' \Theta x(k)), \epsilon_2) T(h) \le \max(\epsilon_3 | W_p + S_p x(k) |, \epsilon_4), \quad (16)$$

where $\Box$ is a constant determined from Equations (3), (4), (5) and $\Box_1 \Box \Box \Box \Box_{2\Box}$ are nonnegative constants that describe the relative and absolute degree of suboptimality at termination. If the nonnegative constants are increased, the controller performance is reduced, but allows for faster solution of Equation 10. Therefore, the nonnegative constants are selected so that the degradation of performance is acceptable for the controller. The nonnegative constants $\Box_3$ and $\Box\Box_4$ are the relative and absolute tolerances on the constraints that when increased allows for a larger violation of the machine constraints, and are be selected a-priori so the violations are acceptable. In the common case, where $\Box_1 = \Box_3 = 0$, only a comparison is needed to check for termination.

Figure 5:
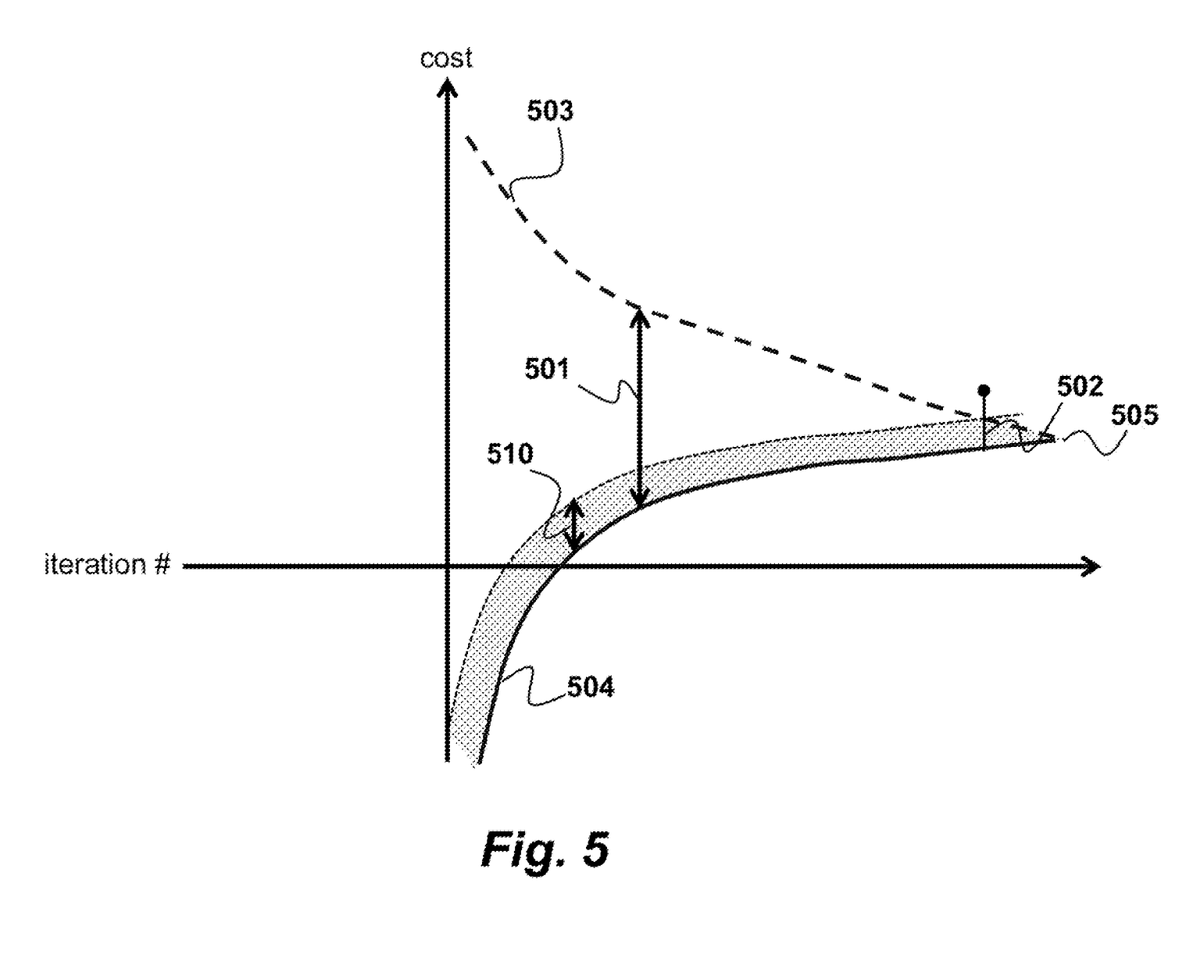
FIG. 5 is a schematic of a termination condition based on a duality gap according to embodiments of the invention.

FIG. 5 shows a graph illustrating a difference 501 between the solutions of the quadratic problem in primal form 503 and dual parametric form 504 as a function of cost vs. iterations. The difference 501 is reduced to zero at optimum solution 505. Some embodiments use a threshold of $\Box_1$ 510 to terminate iterations when the dual solution 502 is near optimal.

Acceleration Techniques

Some embodiments reduce the PQP iterations by periodically or intermittently applying an acceleration technique in a specific subspace of the optimization problem space. Those embodiments are based on a recognition that a various factors can slow down the convergence of PQP. For example, when the current candidate solution of the PQP is close to zero, or scaling factors of the PQP are close to one, the change of the candidate solution can be very small.

To avoid such problem, some embodiments update the value of the candidate solution by a different type of operation, i.e., not scaling. Acceleration techniques of one embodiment update the candidate solution by finding an update direction and a step length along that direction. The typical technique uses a negative cost function gradient direction, and performs an optimal step selection. For example, some embodiments determine gradient of the convex quadratic function to be minimized by dual problem at the candidate solution.

Figure 6:
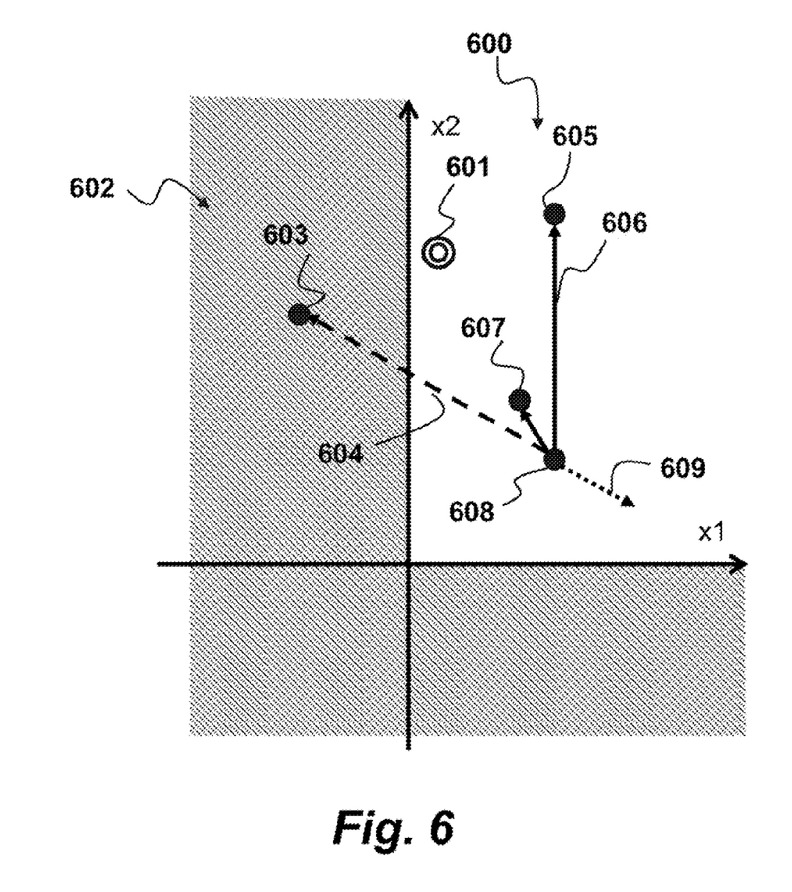
FIG. 6 is a graph comparing a difference between PQP update iteration, and various acceleration techniques according to some embodiments of the invention.

FIG. 6 shows a graph comparing a difference between PQP update iteration, and various acceleration techniques according to some embodiments of the invention. The update 607 of a candidate solution 608 can be obtained by the iteration of the PQP, e.g., using Equation 12, towards the optimal solution 601. The update 607 remains in the feasible region 600 of the solutions but may be very short, i.e., the difference between the solutions 608 and 607 is small.

One embodiment considered determining the updated solution 603 with acceleration techniques using a decreasing direction 604, which is the negative of the cost function gradient 609. However, the change of the candidate value according to the gradient may take the candidate solution outside of feasible region of the dual problem. And, if the solution goes into the unfeasible region, the PQP method breaks. For example, the solution according may leave the feasible region 600 and enter the unfeasible region 602.

However, some embodiment are based on another realization that in contrast with the feasible region of the primal problem, which depends on the specific operation, the feasible region of the dual problem is always non-negative cone (positive), and is not bounded. Thus, if the anti-gradient is represented by its components, one component may point into the unfeasible region, and one component may point toward the unbound direction, i.e., the direction where the positive cone is unbounded. Thus, some embodiments select only the components of the anti-gradient that points toward the unbound direction to update the candidate solution. Such modification of the anti-gradient guaranties ensures that the candidate solution always stays in the feasible region.

For example, one embodiment adapts the acceleration technique to be used with the iterations in Equation 12. This embodiment determines a search direction 606, that is a non-negative component of the negative cost function gradient 609, and then performs an optimal step in that direction 606. The updated solution 605 moves only towards increasing directions in any axis, and because the candidate solution is in the feasible region and the constraints in Equation 11 are non-negative, the solution after the acceleration step is in the feasible region. This is because only the components of the solution that moves towards higher values are adjusted. Thus, large steps towards the optimum can be achieved without entering the infeasible region.

Thus, some embodiments use a subspace of the negative gradient to maintain the feasibility of the candidate solution $Y(h+1)$ as needed by the iterations in Equation 12. The subspace can be obtained in Equation 17 by the operator (x)

$$p^{(h)} = (Y^{(h)\prime}Q_d Y^{(h)} + S_d x(k) + W_d)^{-} \quad (17)$$

$$\alpha^{(h)} = \begin{cases} -\dfrac{(Y^{(h)\prime}Q_d Y^{(h)} + S_d x(k) + W_d)^{\prime} \cdot p^{(h)}}{p^{(h)\prime}Q_d p^{(h)}} & \text{if } p^{(h)\prime}Q_d p^{(h)} > 0 \\ 0 & \text{otherwise.} \end{cases}$$

$$Y^{(h+1)} = Y^{(h)} + \alpha^{(h)} p^{(h)}$$

The method in Equation 17 does not require an a-posteriori projections, sometimes used to recovery feasibility, which may be computationally demanding and usually reduce the effectiveness of the acceleration steps.

Figure 7:
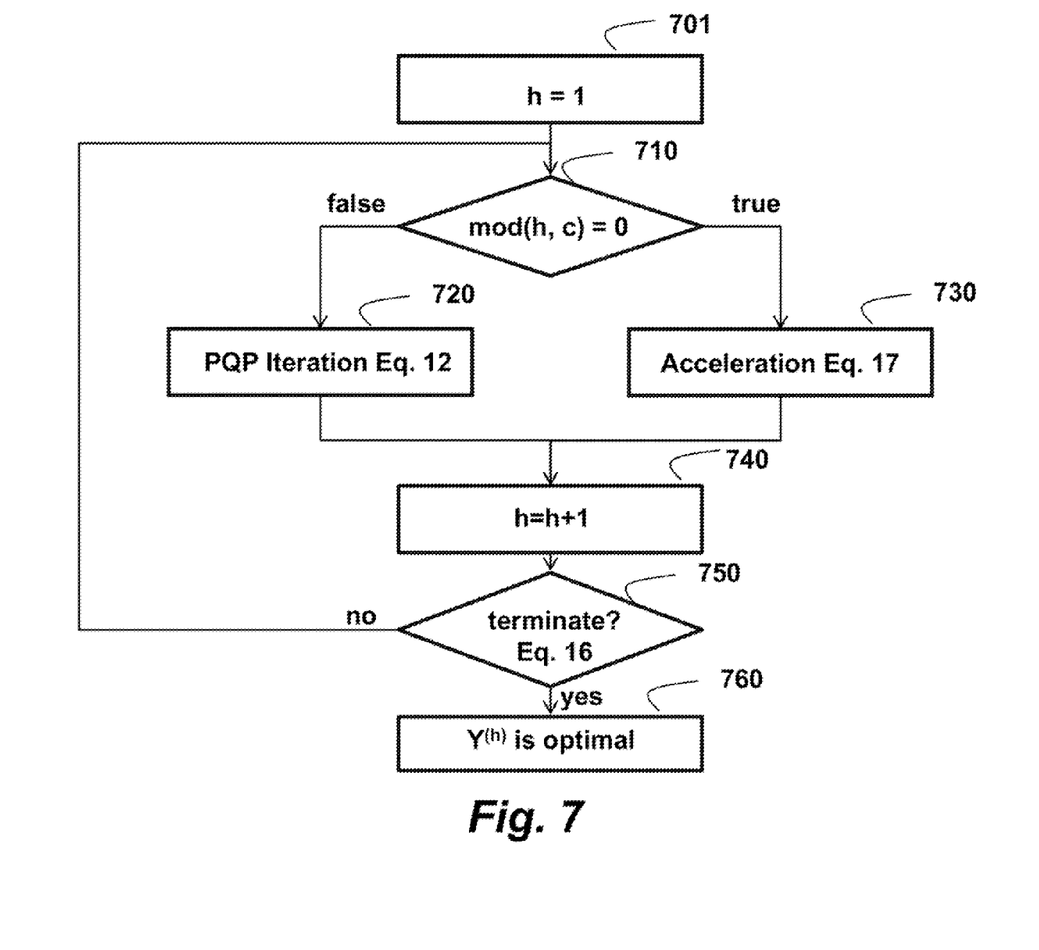
FIG. 7 is a flow chart of an optimization procedure that integrates PQP iteration and subspace acceleration according to embodiments of the invention.

FIG. 7 shows a block diagram of a method integrating the iterations in Equation 12 with the acceleration in Equation 17 according to one embodiment. The index h is initialized 701 to 1, and then determine 710 if mod(h, c)=0, where c is a predefined positive integer constant greater than 1. The predetermined frequency 1/c of the acceleration steps, out of total steps, should not larger than 0.5, and optimally is between 0.02 and 0.2 to guarantee convergence.

The method tests the condition 710 and if the condition is false, then the method performs the PQP iteration 720 according to Equation 12. If the condition is true, the method performs the acceleration 730 according to Equation 17. In step 740, the index h is incremented and the method checks 750 for termination according to Equation 16, and returns 760 $Y^{(h)}$ as the optimal solution if the termination condition is met.

PQP-MPC Controller

Figure 8:
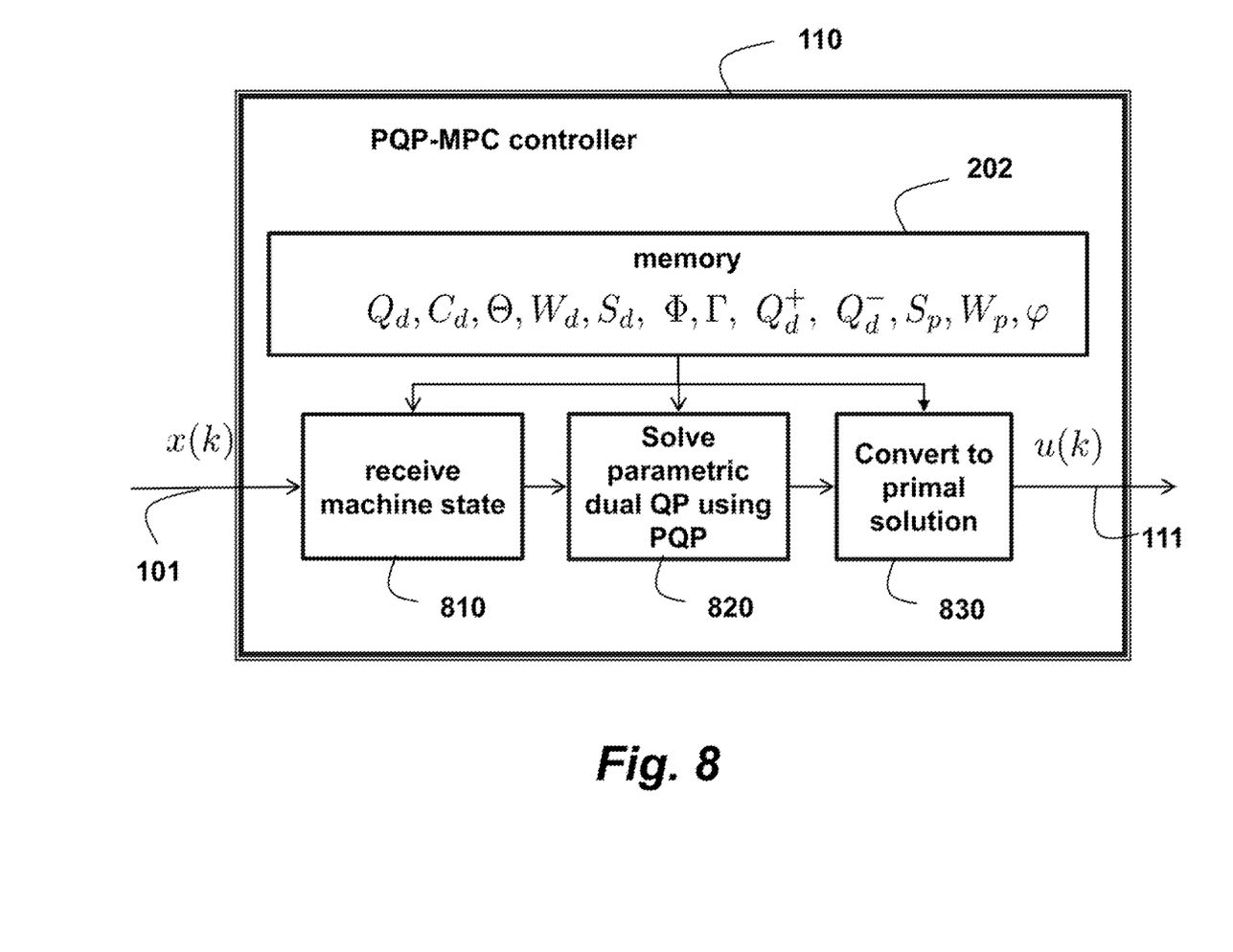
FIG. 8 is a block diagram of a controller process according to embodiments of the invention.

FIG. 8 shows a block diagram of a controller 110 according to one embodiment of the invention. The memory 202 of the controller stores various problem matrices including one or combination of $$Q_d, \Theta, W_d, S_d, \Phi, \Gamma, Q_d^+, Q_d^-, S_p, W_p, \phi,$$

which are, respectively, the dual cost Hessian matrix $Q_d$, the dual cost state-dependent constant term $\Theta$, the dual cost state-independent linear term vector $W_d$, the dual cost state-independent linear term vector $S_d$, the dual to primal transformation matrix $\Phi$, the dual to primal state-dependent transformation matrix $\Gamma$, the positive part of the dual cost Hessian matrix $Q_d^+$, the negative part of the dual cost Hessian matrix $Q_d^-$, the state-dependent primal constraint constant matrix $S_p$, the state-independent primal constraint constant vector $W_p$, the PQP convergence constant vector $\phi$. Those problem matrices represent the structure, and dynamics of the machine to be controlled, as well as constraints and of the machine and objectives of the operation. The matrices are described above in relation with Eqs. (10), (11), (12), and (13).

The controller receives 810 the command 101 and the state 121 of the machine. The dual solution is determined 820 by the method of FIG. 7, and the solution is determined 830 by Equation 13 to produce the input 111. The method makes use of the termination conditions based on the duality gap, and the primal feasibility efficiently determined by Equation 16.

Figure 9:
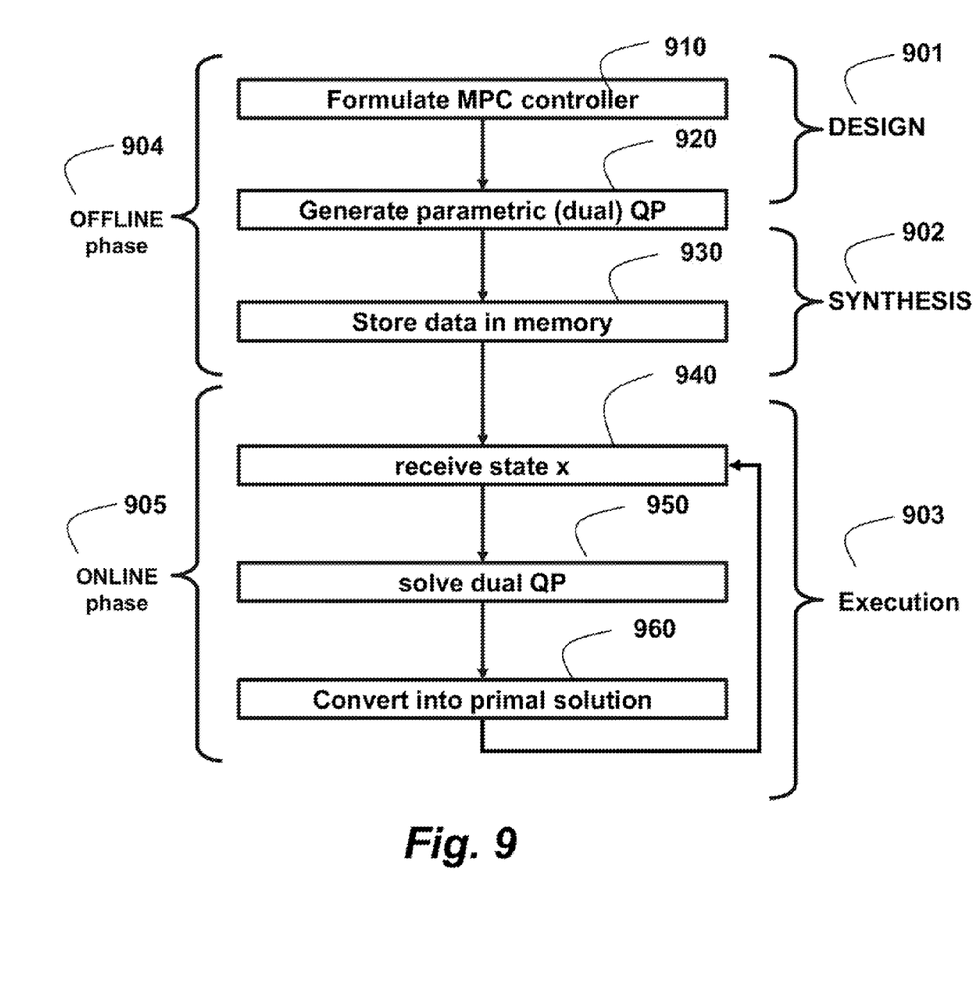
FIG. 9 is a block diagram of a process for designing, synthesizing and performing the method in the controller according to embodiments of the invention.

FIG. 9 is a block diagram of a process for designing, synthesizing and performing the method in the controller according to embodiments of the invention. The implementation and operation of the controller 110 include a design task 901, a synthesis task 902, and controller real-time execution 903. There are offline (preprocessing) 904 and online (real-time) 905 phases. In one embodiment, the MPC controller is formulated 910 according to Equation 5. The parametric (dual) QP is formulated 920 according to Equation 16. Data, such as the matrices, are stored 930 in the memory during the offline phase. Then during online operation, the command is received 940. The dual QP is solved 950 by the method of FIG. 7, followed by determining the solution 960 of the QP problem in primal parametric form by Equation 13.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

The invention claimed is:

1. A method for controlling an operation of a machine using a model predictive control (MPC), comprising:
measuring a state of the operation of the machine;
determining a dual solution of a dual parametric problem of a parametric form of the MPC using a parallel quadratic programming (PQP) rescaling iteratively, using predetermined coefficients and a parameter of the dual parametric problem, a candidate dual solution of the dual parametric problem, wherein the predetermined coefficients of the dual parametric problem include data representing dynamics of the machine and constraints on the operation of the machine, and wherein the parameter of the dual parametric problem includes the measured state of the operation of the machine;
determining a primal solution of a primal problem of the MPC using the dual solution of the dual parametric problem to produce a control input for the machine; and
controlling the machine according to the control input, wherein steps of the method are performed by a processor.

2. The method of claim 1, wherein the PQP applies an update law to the candidate dual solution, wherein the update law is multiplicative update law applied in parallel on a plurality of processors.

3. The method of claim 2, wherein the update law is a multiplicative first-order optimality condition expressed as a ratio that independently rescales elements of the candidate dual solution.

4. The method of claim 2, wherein at least two elements of a vector of the candidate dual solution are rescaled independently by applying the update law in parallel on at least two processors.

5. The method of claim 1, wherein the PQP rescales the candidate dual solution Y according to $$Y^{(h+1)} = \frac{(Q_d^- + \varphi)Y^{(h)} + (S_d x(k) + W_d)^-}{(Q_d^+ + \varphi)Y^{(h)} + (S_d x(k) + W_d)^+} Y^{(h)},$$

wherein h is an index of an iteration, $S_d$, $W_d$, $Q_d^+$, $Q_d^-$, are non-zero predetermined matrices representing the dynamics and the constraints of the machine, $\phi$ is a convergence coefficient, an operator $(x)^-$ indicates a function $\max(0, -x)$ and an operator $(x)^+$ indicates a function $\max(0, x)$ component-wise for x, k is a time when the state x(k) is sampled.

6. The method of claim 1, further comprising:
transforming the MPC into the parametric form; and
determining the dual problem of the parametric form of the MPC.

7. The method of claim 1, further comprising:
determining a termination condition for the PQP based on a duality gap between the dual and primal solutions; and
determining the dual solution iteratively until the termination condition is met.

8. The method of claim 7, wherein the termination condition includes the duality gap and constraints slacks expressed as a function of the dual parametric form.

9. The method of claim 1, further comprising:
modifying a value of the candidate dual solution of an intermediate iteration with an operation different from the rescaling.

10. The method of claim 9, further comprising:
modifying the value of the candidate dual solution in a direction indicated by a negative component of the cost function gradient that does not decrease the value of the candidate dual solution in any axes.

11. A method for controlling an operation of a machine using a model predictive control (MPC), comprising:
acquiring predetermined coefficients representing dynamics of the machine and constraints on the operation of the machine;
formulating the MPC as a dual parametric problem with the predetermined coefficients, wherein a state of the operation is a parameter of the dual parametric problem;
measuring the state of the operation of the machine;
solving, using the predetermined coefficients and the parameter of the dual parametric problem, the dual parametric problem using a parallel quadratic programming (PQP) rescaling iteratively a dual solution of the dual parametric problem;
determining a primal solution of a primal problem of the MPC using the dual solution of the dual parametric problem to produce a control input for the machine; and
controlling the machine according to the control input, wherein steps of the method are performed by a processor.

12. The method of claim 11, wherein the formulating the MPC comprises:

transforming the MPC into a parametric form; and
determining a dual problem of the parametric form of the MPC.

13. The method of claim 11, further comprising:
determining a primal solution of a primal problem of the MPC using the dual solution of the dual parametric problem.

14. The method of claim 11, wherein the matrices include one or combination of a dual cost Hessian matrix $Q_d$, a dual cost state-dependent constant term $\Theta$, a dual cost state-independent linear term vector $W_d$, a dual cost state-independent linear term vector $S_d$, a dual to primal transformation matrix $\Phi$, a dual to primal state-dependent transformation matrix $\Gamma$, a positive part of the dual cost Hessian matrix $Q_d^+$, a negative part of the dual cost Hessian matrix $Q_d^-$, a state-dependent primal constraint constant matrix $S_p$, a state-independent primal constraint constant vector $W_p$, a PQP convergence constant vector $\phi$.

15. A controller for controlling an operation of a machine, comprising:
at least one sensor for measuring a state of the operation of the machine;
a memory for storing predetermined coefficients representing dynamics of the machine and constraints on the operation of the machine; and
a processor for
solving, using a parallel quadratic programming (PQP) with the predetermined coefficients, a dual problem of a parametric form of a model predictive control (MPC), wherein a parameter of the dual problem includes the measured state of the operation of the machine;
determining a primal solution of a primal problem of the MPC using the dual solution of the dual parametric problem to produce a control input for the machine; and
controlling the machine according to the control input.

16. The controller of claim 15, wherein the matrices include one or combination of a dual cost Hessian matrix $Q_d$, a dual cost state-dependent constant term $\Theta$, a dual cost state-independent linear term vector $W_d$, a dual cost state-independent linear term vector $S_d$, a dual to primal transformation matrix $\phi$, a dual to primal state-dependent transformation matrix $\Gamma$, a positive part of the dual cost Hessian matrix $Q_d^+$, a negative part of the dual cost Hessian matrix $Q_d^-$, a state-dependent primal constraint constant matrix $S_p$, a state-independent primal constraint constant vector $W_p$, a PQP convergence constant vector $\phi$, and wherein the PQP rescales the candidate dual solution Y according to $$Y^{(h+1)} = \frac{(Q_d^- + \varphi)Y^{(h)} + (S_d x(k) + W_d)^-}{(Q_d^+ + \varphi)Y^{(h)} + (S_d x(k) + W_d)^+} Y^{(h)},$$

wherein h is an index of an iteration, and k is a time when the state x(k) is sampled.

* * * * *